Patented Dec. 3, 1929

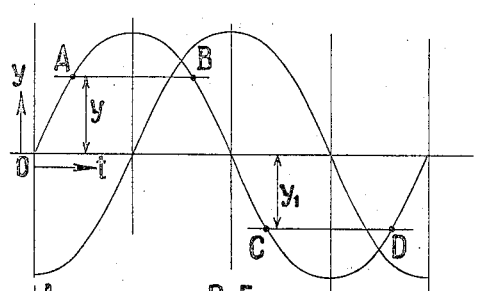
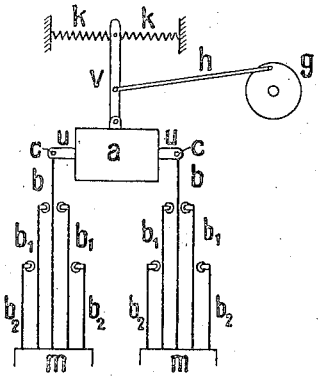
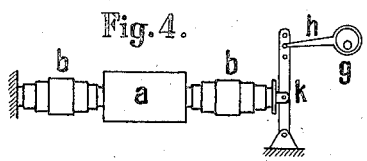
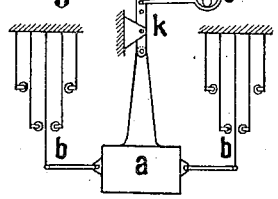
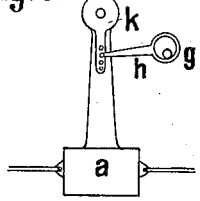
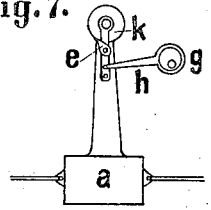
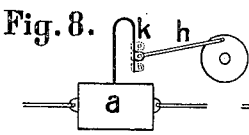
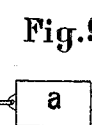
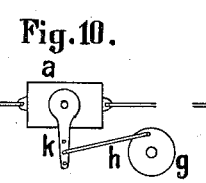
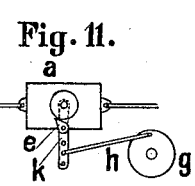
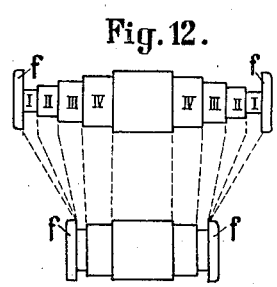
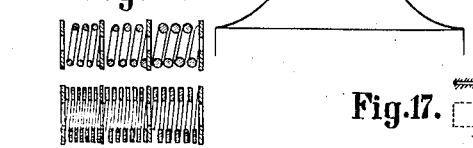
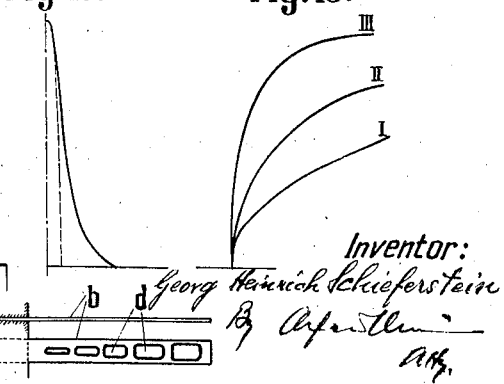

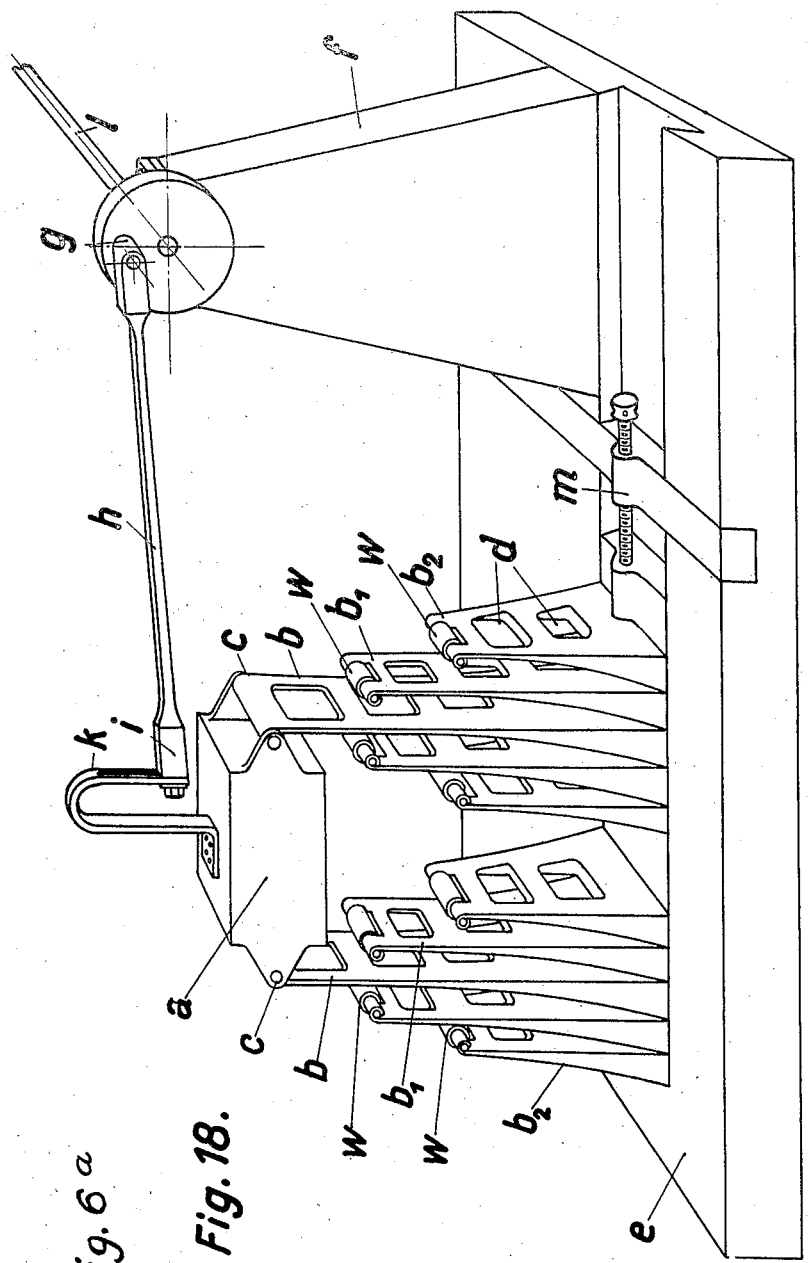
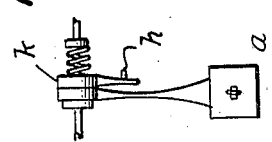
Fig. 6a
Fig. 18.

1,737,772

UNITED STATES PATENT OFFICE

GEORG HEINRICH SCHIEFERSTEIN, OF BERLIN-CHARLOTTENBURG, GERMANY

OSCILLATING SYSTEM

Application filed November 6, 1924, Serial No. 748,028, and in Germany November 15, 1923.

My invention relates to improvements in oscillating systems.

In rotating mechanisms intended for the transmission of energy or to perform work the number of revolutions are as a rule so regulated that the best effect is obtained for the particular work to be done. Thus for example a circular saw will be driven at a speed at which the sawing operation produces the most favorable effect whilst simultaneously still keeping the heat generated within permissible limits. However, in the case of mechanisms which are moved to and fro, the speed varies four times from zero to a maximum during each period. If the periodicity of such a device is so selected that the most favorable speed lies between zero and the maximum speed attained, then it must be passed four times during each period for a very short interval of time.

For a better understanding the invention will hereinafter be more fully explained with reference to the accompanying drawings.

Fig. 1 shows the velocity and tension curves of an oscillation occurring in accordance with the sine law; Fig. 2 shows diagrammatically a structure capable of oscillations, in which, according to the present invention, in the state of oscillation, the velocity and tension curves are not in accordance with the sine law, but are flatter; Fig. 3 shows the velocity and tension curves of a device in accordance with the present invention; Fig. 4 shows diagrammatically a structure capable of oscillation in accordance with the present invention, in which another form of elastic means and another kind of coupling for starting the oscillations are used; Fig. 5 shows diagrammatically a structure capable of oscillation in accordance with the present invention, in which, a further manner of coupling is used; Figs. 6 to 11 show other possible manners of coupling for starting structures capable of oscillations in accordance with the present invention; Figs. 12 to 15 and 17 show elastic means for obtaining the object of the present invention; Fig. 16 shows so-called "elastic lines", i. e. the shape of the bending of elastic means for various dimensions; Fig. 18 shows by way of example an embodiment according to the present invention.

During the to and fro motion of a mechanical device, driven by a crank-loop which moves according to the sine law as shown in Fig. 1 of the accompanying drawings, the most favorable working speed, which may correspond to the ordinates $y$ and $y'$, would intersect the curve at the points AB and CD.

A practically identical process occurs in the case of a crank gearing, which (with an endless connecting rod) also moves in a sine curve.

These considerations show that numerous mechanisms which are compelled to reciprocate for the purpose of transmitting power act very inefficiently as regards the utilization of the most favorable speed.

However, also in the case of oscillating systems the oscillations are usually in accordance with the sine law and this moreover forms the basis of the entire study of oscillations.

The present invention is based on a new perception according to which it is possible to construct elastic oscillating mechanical systems—provided that they are loosely coupled together—in such a manner that the course of the speed and tension curve will differ entirely from the sine curve. Both curves may in the median position of the oscillating system undergo such a strong deformation i. e., flattening, that the speed will be maintained approximately constant during a considerable period and may thus be adapted to the most favorable working speed. Such a system tends after each change in direction to return to the most favorable speed as rapidly as possible and maintains this speed approximately until shortly before the next sudden change in direction.

Fig. 2 shows diagrammatically by way of example a construction suitable for carrying the invention into practical effect. $a$ is a mass which is jointed to the top of springs $b$ at the point $c$ by means of two connecting rods $u$. The springs $b$ are fixed at their base at points $m$. Two pairs of springs $b'$, $b'$ and $b^2$ $b^2$ are also fastened at $m$. A lever $v$ is jointed to the mass $a$ and is adapted to be moved to and fro by means of a crank $g$ connected thereto, thus tensioning the two coupling springs $k$ $k$. When the crank $g$ is rotated only a very small part of this movement will be transferred to the mass $a$, whilst the coupling springs $k$ $k$ will be strongly tensioned. On continued rotation of the crank, the oscillation of the mass $a$ will always increase and it will thus bend the springs $b$ $b$ more and more, so that they thereupon touch and bend the springs $b'$, $b'$ and finally the springs $b^2$, $b^2$. By the introduction of the pairs of springs $b'$ and $b^2$ the elastic means will be very greatly increased at this moment and the speed and tension curves which are flatter in their middle position will now ascend and descend with relative suddenness and thus the course of the curve shown in Fig. 3 which is that desired in accordance with the present invention, is obtained.

Assuming that the oscillating system is in one of its extreme limit positions, then its speed at this point is zero. In the next moment, on leaving this point the speed of the mass $a$ increases relatively quickly as shown by curve I, Fig. 3, attaining the most favorable working speed at the point A, from which the speed curve is only slightly deflected. Only on reaching the point B (Fig. 3), does the speed curve sink below the most favorable working speed B and then falls rapidly to zero after which the same process of movement occurs in the reverse direction, passing the points CD as illustrated by the negative part of the curve. The potential curve II, Fig. 3, which illustrates the spring-tension, runs during its first quarter as a reflected image of the speed curve I. It starts from the median position, and rises quickly to its maximum at the point E after insertion of the springs $b'$, $b'$ and $b^2$, $b^2$. From E onwards the potential curve sinks as rapidly and as symmetrically towards the next median position, from whence it begins to assume a negative form retaining the same external shape.

As previously stated it is evident that since the system commences with small movements and only gradually describes larger oscillations, the energy transmitted by the crank $g$ must be conveyed through a flexible medium, i. e. a so-called "loose coupling", because each arbitrary connection would prevent the mass $a$ oscillating freely with a variable amplitude.

The term "loose coupling" is used to designate a means or a method for transmitting energy in a mechanically oscillating manner by yielding means, e. g. elastic means, such as springs, gas- or air-cushions etc., inert masses, such as a fly-wheel, reciprocating masses, non-balances, pendulums, etc., friction-, liquid- or other resisting or varying means, or a combination of two or more of such means, in which two oscillating mechanical systems as regards amplitude and periodicity are made so alike and are so connected by yielding mechanical means that the ratio of the energy transmitted by the coupling to the energy existing in the oscillating structure during operation $Am$ is equal or substantially equal to the double dampening decrease $=2\delta$ of the oscillating structure, i. e.

$$\frac{Aw}{Am} = \frac{\frac{1}{2}V^2.w.t.}{\frac{1}{2}m.V^2} = 2\delta$$

$Aw$ Dampening work or coupling energy for each period.
$Am$ Oscillating work for each period.
$V$ Maximum speed.
$w$ Ohm resistance, or its equivalent.
$t$ Time of oscillation.
$m$ Mass.
$\delta$ Logarithmic decrement of the dampening.

or in other words, that a yielding mechanical member (which is designated as the loose coupling), which acts between a driving and a substantially equally tuned driven oscillating mechanism transmits for each half oscillation an energy which, as regards size, shape and phase, compensates the loss during each half oscillation. The loose coupling therefore, is adapted to transmit energy, during a corresponding phase displacement, by mass action, tension, friction or by way of a fixed connection during a certain period of time without disturbing the oscillation.

Couplings can be divided into elastic couplings, mass couplings, friction couplings and time couplings. Each of these four different types of couplings have a potential form as shown in Figs. 4, 5, 6 and 7 and a kinetic form as shown in Figs. 8, 9, 10 and 11, so that eight distinctly different rudimentary forms are possible.

These eight rudimentary forms can be combined together in various ways; thus for instance, in any practical embodiment the potential or the kinetic element may preponderate as desired.

Moreover, it is conceivable that mass and elasticity or any other combinations are applicable simultaneously, and that finally three, four or more coupling properties may reside within one and the same coupling construction. Any one of these constructions characterised as "loose couplings" or any combinations of such means suitable for such couplings must however be used in combination with the herein-described oscillating system in order to produce the above described effect, i. e., flattened oscillation.

In Fig. 4 relatively large power is transmitted over a small path by an eccentric gear $g$ through a connecting rod $h$ to the lever $k$, which represents the coupling, and energy is conveyed in a potential form to the spring $b$ and transferred to the oscillatable system consisting of the mass $a$ and the springs $b$. As soon as the speed of the eccentric $g$ coincides with the natural frequency of the oscillating system $a\ b$, so that two systems are in tune, more or less energy is transmitted to the oscillating device according to whether the coupling is a tighter or looser one. The coupling may be made tighter or looser by moving the connecting rod $h$ in relation to the coupling lever $k$, that is by shortening or lengthening the lever arm.

Fig. 5 illustrates a device in which the energy is transmitted in the above-described manner by the eccentric $g$ and rod $h$ to the lever $k$ and from thence to the oscillating system consisting of the mass $a$ and springs $b$. In this case again the maximum of energy transmission is obtained when resonance takes place.

In the device shown in Figs. 6 and 6ª power is transmitted by friction between the lever $k$ and the point of attachment of the mass $a$ the action of the eccentric $g$ and connecting rod $h$ being the same as that previously described.

In Fig. 7 the eccentric $g$ and rod $h$ are connected to a lever $k$. A ratchet $e$ which is fastened to the lever $k$ only transmits energy to the mass $a$ when the speed is less than that of the lever $k$. Thus, the coupling device of Fig. 7 only comes into operation at certain periods and may therefore be designated as a time coupling.

In Fig. 8 the transmission to the elastic coupling $k$ is effected by the crank $g$ through the connecting rod $h$. The power, which in this case is transmitted through a larger crank path, is essentially smaller so that under otherwise similar conditions the same energy can be transmitted to the oscillating system. Thus whilst the transmission in the case of the couplings shown in Figs. 4 to 7 is effected potentially the transmission in the case of the couplings illustrated in Figs. 8 to 11 is effected kinetically.

Fig. 9 illustrates a kinetic mass-coupling. The crank gear $g\ h$ drives a reciprocating lever $k$ which is provided with an adjustable mass $G$. The inertia of this mass causes the mass $a$ to oscillate.

Fig. 10 shows a kinetic friction coupling. In this case the crank gear $g\ h$ drives a friction lever $k$ which transfers the power to the mass.

Fig. 11 represents a kinetic time-coupling, the crank gear $g\ h$ drives the lever $k$, to which is attached a ratchet $e$ which periodically transfers energy to the mass $a$.

According to choice and dimensions of the individual springs and the supplementary springs $b'$, $b'$ and $b^2$, $b^2$ it is possible, as can be easily understood to make the speed curve more or less flat. The same result is obtained when springs are used in accordance with Figs. 12, 13, 14 and 15.

Fig. 12 illustrates a double buffer spring the end coils of which are of smaller dimensions. The springs are compressed or extended between two flanges $f$. On moving the two flanges towards each other naturally the weaker coils I and II are compressed in the first place, and since they gradually recede into the coils II and III and thereupon IV they are finally cut out.

A similar result is obtained when using a spring dimensioned as shown in Figs. 14 or 15. Such a spring which is greatly overdimensioned in the vicinity of its point of attachment bends at first mainly at its upper part until the bending strain of the upper part is gradually transformed into a tension, when the lower part will be more strongly loaded and will be able—at a relatively small amplitude—to accumulate a relatively large amount of potential energy.

Fig. 17 shows diagrammatically by way of example another construction suitable for carrying out the invention. In this case a flat spring $b$ is used of equal breadth and strength having suitable slit so that it becomes a body of equal strength or an overdimensioned spring.

In the embodiment shown in Fig. 18, two sets of elastic means $b_2$, $b_1$, $b$, $b_1$, $b_2$, are firmly clamped on a base plate $e$ by means of a clamping device $m$. These elastic means, at their bases, are made broader and stronger, and are provided with openings $d$. By each of the said means the result is obtained that the elastic line, i. e. the shape assumed during the bending follows the curve III, according to Fig. 16. The intermediate springs $b$, $b$, pivoted by the pivots $c$, $c$, support the oscillating mass $a$. The additional springs $b_1$, $b_1$ and $b_2$, $b_2$ carry at their free ends rollers $w$, $w$, in order to enable the oscillation to take place unabsorbed as much as possible. The oscillating structure built up in this manner, according to the present invention, is caused to oscillate by a loose coupling $k$. To this end, the driving power is transmitted to the oscillating structure by means of a crank mechanism $g$, $h$, and the coupling member $k$ from a shaft $l$ which is supported in the bearing $f$. The crank rod $h$ is adjustable at the coupling member, so that by a modification of the adjustment, the power transmitted to the oscillating structure can be varied.

It is possible to conceive that the desired result may be obtained with other spring constructions than herein described without departing from the spirit and scope of the invention. All springs attached at one end show by their elastic lines, that is, the curve obtained by holding one end firmly and bending the other, whether or not they are suitable for the purposes of the present invention. Springs in which the elastic line runs similarly to the curve I of Fig. 16, are unsuitable whilst a spring of triangular form bending through a circular arc as shown by the curve II of Fig. 16 gives a better result, However this result can be considerably increased by springs, which are over-dimensioned at their point of attachment and which bend in accordance with the curve III of Fig. 16.

Besides having the aforesaid advantage of better adapting the oscillation curve to the most favorable working speed, this device also renders possible the employment of greater amplitudes of oscillation at relatively high speeds. It is evident that a relatively large mass can only be moved to and fro at high speeds by springs bending in accordance with curve I (Fig. 16) when these springs are strongly dimensioned throughout. In the case of springs which as above described, in their middle position when relatively strongly bent take up comparatively small power, but on the other hand are adapted to accumulate large quantities of potential energy in their extreme end positions it is possible to obtain a high periodicity through a relatively large path and with a large mass, i. e., springs of this type combine the advantages of great elasticity and capability of accumulating energy.

The desired result, that is oscillating systems with relatively flat speed and tension curves in the medium positions and steep ascending curves in the extreme end positions may also be obtained by the employment of gas- and air cushions in combination with loose couplings.

An interesting property of the hereinbefore described systems is that at small amplitudes they exhibit a slow natural frequency whilst at increasing amplitudes their natural frequency always increases. Thus, if a system is moved to and fro through a very small amplitude the supplementary springs may be regarded as being quasi cut out, whereby the natural frequency of the system is correspondingly decreased. In this form the whole system would approach the resonance condition at a relatively low natural frequency. However before it can attain resonance, the supplementary springs are cut-in owing to the increasing amplitude of oscillation and thus the natural frequency is increased, this procedure occurring several times according to the number of the supplementary elastic means used. Thus such a system—starting from a low periodicity, up to its highest natural frequency—is always in a condition immediately before that of resonance, and therefore always gives an excellent efficiency. Systems of this kind should therefore be regarded as particularly elastic, because they have an excellent efficiency within wide limits.

When the maximum speed and thus the maximum power transmission is attained a low variation in the load also produces only a slight varition in amplitude, because at the last moment only small tensions of the over-dimensioned springs are sufficient to accumulate relatively large forces.

The hereinbefore described systems in combination with transmision gears offer special advantages, as flattened speed curves adapt themselves most favorably to a noiseless and relatively soft throwing in of the gears especially when several gear mechanisms are used simultaneously.

The employment of the aforesaid systems in working machines such as sawing machines, mowing machines and the like offers special advantages, as the most favorable speed is maintained for a relatively long time.

A further important advantage of the aforesaid systems is that the over-dimensioned springs fitted for large energy accumulation do not slacken and are not destroyed even with oscillations of high periodicity.

It is obvious that the springs of the hereinbefore described type are very suitable for use as coupling springs, just because these springs allow a large energy transmission when greatly bent. The over-dimensioning of the springs is especially favorable because their life is prolonged in spite of the high periodicity and the heavy strain.

The distance between the several spring laminations may be greater or smaller and the individual laminations may be provided at their free end with rollers or balls in order to diminish damping effects.

I do not claim broadly herein the method of and means for loose mechanical coupling nor the other features not specifically pointed out in the claims, having made a separate application for such features under Serial No. 688,876 filed January 26, 1924.

Claims:

1. An oscillating mechanical system comprising a mass, and elastic means operatively connected with said mass and having a resistance increasing more rapidly than linear as to deflection unit, the connection of said mass with said elastic means constiuting a pseudo-harmonic oscillating structure, a mechanism for reciprocating said structure, and a yielding device operatively connecting said structure and said mechanism and adapted to transmit for each period only so much energy that the ratio of the energy thus transmitted to the energy existing in said oscillating structure equals or substantially equals the double dampening decrease of said oscillating structure.

2. An oscillating mechanical system comprising, in combination, a reciprocating mass, a plurality of elastic members symmetrically arranged in stages to successively apply resistance to movement of said mass, thereby accumulating energy, said members giving up energy to said mass on change of direction of movement, a mechanism for reciprocating said mass, and a loose coupling between said mass and said mechanism.

3. An oscillating mechanical system comprising, in combination, a reciprocating mass, a set of springs arranged at each end of said mass, each set including a central spring attached to said mass and one or more springs on each side of said central spring and adapted to contact said central spring upon displacement of said mass and adding resistance to movement of said mass upon contact, a mechanism for reciprocating said mass, and a loose coupling between said mass and said mechanism.

4. An oscillating mechanical system comprising, in combination, a reciprocating mass, a plurality of double curved springs with two point attachment at each end of said mass, of which the movable end of one spring at each end of said mass is attached to the mass, and the remainder are adapted to act on said mass in succession as the mass reciprocates, a mechanism for reciprocating said mass, and a loose coupling between said mass and said mechanism.

5. An oscillating mechanical system comprising, in combination, a reciprocating mass, a set of springs arranged at each end of said mass, each set including a central spring attached to said mass and one or more springs to each side of said central spring and adapted to contact said central spring upon displacement of said mass and adding resistance to movement of said mass upon contact, a mechanism adapted to reciprocate said mass at a rate corresponding to the natural frequency of vibration of the mass and elastic means, and a loose coupling between said mass and said mechanism.

6. An oscillating mechanical system comprising, in combination, a naturally oscillating unit consisting of a movable mass, and a plurality of elastic elements having stationary base points and movable head points, the cross section at the base points being greater than at the head points, a mechanism for reciprocating said mass, and a yielding mechanical means operatively connecting said mass and said mechanism and adapted to transmit for each period only so much energy that the ratio of the energy thus transmitted to the energy existing in the oscillating unit equals or substantially equals the double dampening decrease of said oscillating unit.

7. An oscillating mechanical system comprising, in combination, a naturally oscillating unit consisting of a movable mass, and a plurality of elastic elements comprising slitted members having stationary base points and movable head points, the cross section at the base points being greater than at the head points, a mechanism for reciprocating said mass, and a yielding mechanical means operatively connecting said mass and said mechanism and adapted to transmit for each period only so much energy that the ratio of the energy thus transmitted to the energy existing in the oscillating unit equals or substantially equals the double dampening decrease of said oscillating unit.

In testimony whereof I affix my signature.

GEORG HEINRICH SCHIEFERSTEIN.